United States Patent [19]
Johnston

[11] Patent Number: 4,748,862
[45] Date of Patent: Jun. 7, 1988

[54] STARTER DRIVE HAVING A CONTAMINANT COLLECTING BUSHING

[75] Inventor: Robert E. Johnston, Anderson, Ind.

[73] Assignee: General Motors Corporation, Detroit, Mich.

[21] Appl. No.: 26,615

[22] Filed: Mar. 17, 1987

[51] Int. Cl.[4] ........................ F02N 15/06; F16C 33/04
[52] U.S. Cl. ........................ 74/7 R; 74/6; 384/291; 384/624
[58] Field of Search ........................ 74/6, 7 R, 7 A; 384/291, 292, 624

[56] References Cited

U.S. PATENT DOCUMENTS

| | | | |
|---|---|---|---|
| 2,245,431 | 6/1941 | Critchfield | 192/45 |
| 2,902,125 | 9/1959 | House et al. | 192/45 |
| 3,263,509 | 8/1966 | Digby | 74/6 |
| 3,714,834 | 2/1973 | Digby | 74/6 |
| 4,261,625 | 4/1981 | Renaud | 384/624 |

*Primary Examiner*—Allan D. Herrmann
*Attorney, Agent, or Firm*—C. R. Meland

[57] ABSTRACT

A starter drive for cranking an engine. The starter drive has a pinion. A bushing is press fitted to the bore of the pinion. The pinion and bushing are supported for rotation and sliding movement by a shaft or sleeve. A thin film of grease is located between the inner surface of the bushing and the outer surface of the shaft or sleeve. The inner surface of the bushing has a plurality of contaminant collecting grooves. The grooves collect the contaminants to thereby prevent grease degradation and wear out.

5 Claims, 1 Drawing Sheet

STARTER DRIVE HAVING A CONTAMINANT COLLECTING BUSHING

Figure 1:
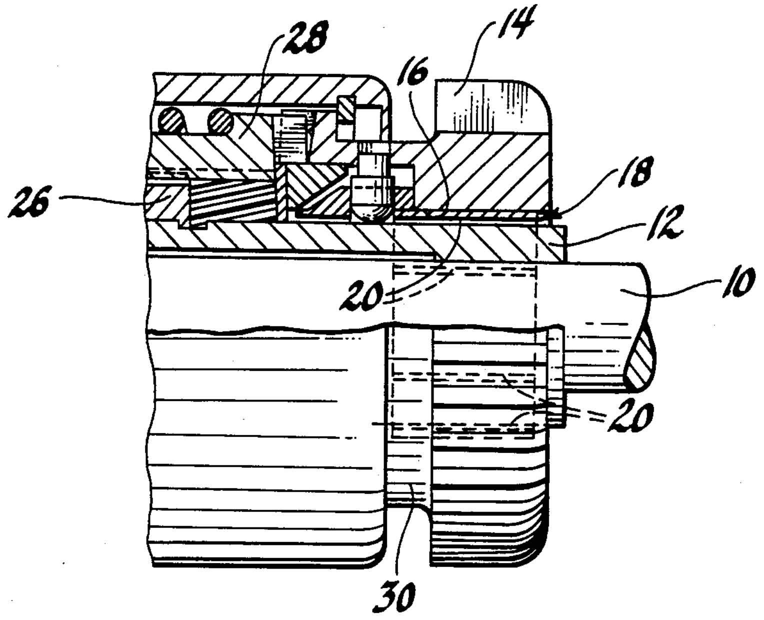

This invention relates to a starter drive for cranking an internal combustion engine and more particularly to a starter drive that has a bushing that is provided with grooves for collecting grease degrading contaminants.

Starter drives for cranking internal combustion engines frequently utilize a bushing that is located in an internal bore of a pinion. The internal surface of the bushing can engage the outer surface of a shaft or a sleeve. Examples of bushings that are utilized in starter drives are disclosed in the U.S. Pat. Nos. to Critchfield 2,245,431, to House et al. 2,902,125 and to Digby 3,263,509.

When a starter drive utilizes a bushing that is press fitted to an internal bore of a pinion the internal surface of the bushing is supported by a shaft or a sleeve. The bushing and pinion slide and rotate relative to the shaft or sleeve and to provide for free movement between these parts a quantity of lubricating grease is applied such that there is a thin film of grease between the inner surface of the bushing and the outer surface of the sleeve or shaft. It has been discovered that this lubricating grease can wear out or degrade to a point where relative movement between the pinion with its press fitted bushing and the shaft or sleeve is impeded to the point where the starter drive will not function properly. It is believed that the degrading or wear out of the grease is due to the fact that the grease becomes contaminated with contaminants such as metal wear particles and corrosion particles.

It is an object of this invention to provide a bearing bushing for a starter drive that is capable of collecting contaminants that would otherwise tend to contaminant the thin film of grease that is located between an inner surface of the bushing and the outer surface of a shaft or sleeve. In carrying this object forward the internal surface of the bushing is provided with a plurality of circumferentially spaced and axially extending grooves that serve to collect contaminants. By collecting the contaminants in these grooves the thin film of grease located over areas between the grooves does not become contaminated to any substantial extent and does not wear out. Further, the grooves provide an additional reservoir for more grease. Accordingly, the expected non-failure life of the starter drive is substantially increased.

IN THE DRAWINGS

Figure 2:
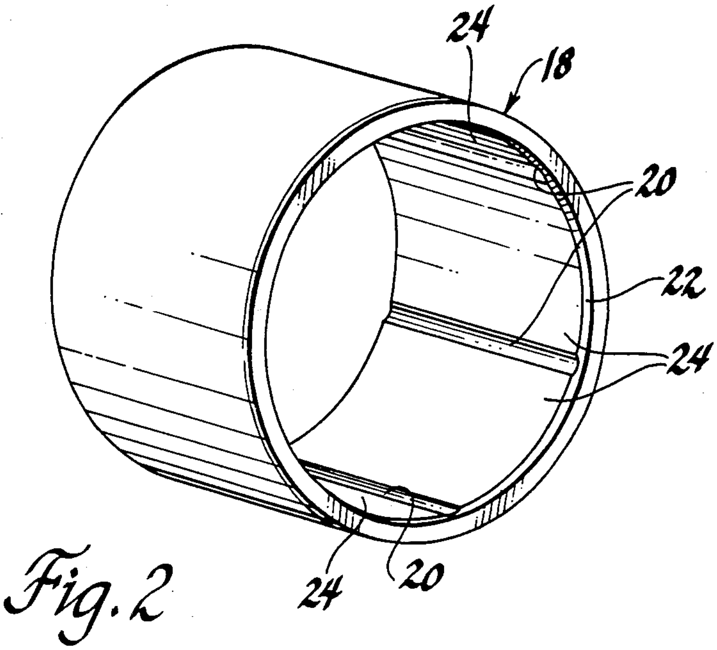

FIG. 1 is a view partly in section of a starter drive that utilizes a bushing made in accordance with this invention; and FIG. 2 is a perspective view of a bushing made in accordance with this invention that is used in the starter drive of FIG. 1.

Referring now to the drawings and more particularly to FIG. 1, a starter drive is illustrated which is supported by a steel shaft 10. The shaft 10 is the output shaft of an electric cranking motor. A tubular steel sleeve 12 is disposed about shaft 10. The starter drive has a pinion gear 14 that is adapted to mesh with the ring gear of an engine. The pinion gear 14 has an internal bore defined by cylindrical surface 16. A bushing 18 is disposed in the bore and has an outer surface that engages surface 16. The bushing 18 is press fitted to the pinion 14 so that the pinion and bushing move together as a unit. The bushing 18 is disposed about sleeve 12. A thin film of grease (not illustrated) is located between the internal surface of bushing 18 and the external surface of sleeve 12. This grease may be a Mobil #29 grease.

The bushing 18 is formed of high density sintered bronze material. The internal surface of bushing 18 is provided with six circumferentially spaced grooves each of which is identified by reference numeral 20. Three of these grooves are illustrated in FIG. 2. The grooves 20 are equally circumferentially spaced by 60° and they extend axially the entire axial length of the internal surface of the bushing. The grooves 20 are parallel to each other and are all parallel to the longitudinal axis of the bushing. The bushing 18 has chamfered annular end portions 22. The areas or arcuately extending surfaces between the grooves have each been identified by reference numeral 24.

By way of example, and not by way of limitation, the bushing may have an outside diameter of 27 mm and an inside diameter of 23.9 mm as measured between opposed surfaces 24. The width of each groove 20 may be about 1.0 to 1.2 mm and each groove may have a radial depth of about 0.15 to 0.20 mm. The bushing may be about 12 mm long. The clearance between the inner diameter of bushing 18 (surfaces 24) and the outer surface of sleeve 12 may be about 0.006 to 0.008 inches.

The purpose of the grooves 20 is to collect contaminants to thereby prevent wear out or degrading of the grease film that is located between the inner surface of bushing 18 and the outer surface of sleeve 12. This will be described in greater detail hereinafter.

The remainder of the starter drive, shown in FIG. 1, will now be described. In this regard it is pointed out that the part of the starter drive to now be described is disclosed in the above-referenced U.S. Pat. No. to Digby 3,263,509 and the disclosure of that patent is incorporated herein by reference.

The sleeve 12 is connected to another sleeve 26 that in turn is splined to shaft 12 in a manner disclosed in the above-referenced Digby patent. The sleeve 26 can drive a driving clutch member 28 though helical splines. Integrally formed with the pinion 14 is a driven clutch portion 30 which operates in a manner described in the above-referenced Digby patent. The remainder of the parts of the starter drive shown in FIG. 1 have not been identified by reference numeral since they are disclosed and described in the above-referenced Digby patent.

It will be apparent from an inspection of FIG. 1 and from the disclosure of the Digby patent that pinion 14 and bushing 18 will, at times, rotate relative to sleeve 12 and that at times the pinion 14 and bushing 18 will slide axially relative to sleeve 12. It is imperative that this relative movement remain free and such free relative movement will be assured as long as the film of grease between the inner surface of bushing 18 and the outer surface of sleeve 12 does not break down or become degraded. During use of the starter drive the grease can become contaminated with contaminants such as metal particles and corrosion particles. The grease that is utilized is made from oils and soap bases. The combination of various wear particles such as metal wear particles, salt and rust particles eventually absorb or use up the oil and the soap base becomes sticky and finally becomes dry-hard. When this happens, the solenoid of the starter has inadequate force to move the bushing and pinion. Thus, it becomes more and more difficult to move bushing 18 as the grease goes from a good quality grease to a sticky composition to no movement with a hard grease. The grease progressively degrades over a period of time of use of the starter drive. In addition to impeding movement of the bushing 18 and pinion 14 the bushing may eventually fail due to scoring.

The grooves 20 serve to collect contaminants. Thus, as the starter drive is operated contaminants that make their way into the thin film of grease are forced into the grooves. The grease in the grooves will become contaminated but the grease film between areas 24 of bushing 18 and the sleeve 12 will not be contaminated or degraded to any substantial extent because the contaminants have been forced into the grooves 20.

The grooves 20 have a benefit in addition to collecting wear particles or contaminants. Thus, grooves 20 form a reservoir for grease so that more grease can be utilized as compared to a bushing that does not have grooves.

The grooves 20 can take configurations other than the configuration shown in FIG. 2. By way of example, the grooves could extend diagonally instead of parallel to the longitudinal axis of the bushing. Generally speaking, any groove configuration can be used as long as the groove configuration is capable of collecting contaminants to an extent that will prevent grease wear out or degradation of the grease.

The bushing 18 has been disclosed as being formed of a sintered bronze material. It could be formed of other materials, for example powdered iron. The preferred material is sintered bronze.

The starter drive bushing of this invention can be used in starter drives other than the type disclosed in the above-referenced Digby patent. Thus, the bushing can be used in any type of starter drive where the bushing is press fitted to the pinion and where the internal surface of the bushing is supported for rotation and sliding movement by a shaft or sleeve.

The starter drive of this invention can be used to crank any type of engine. Thus, it can be used to crank spark-ignited or Diesel engines and could be used to crank turbine or rotary engines.

The embodiments of the invention in which an exclusive property or privilege is claimed are defined as follows:

1. Starter drive apparatus for cranking an engine comprising, a pinion gear that is adapted to be meshed with a ring gear of the engine, said pinion gear having a bore, a tubular metallic bushing disposed within said bore and secured to said pinion gear, a part having an outer annular bearing surface, said tubular bushing and pinion gear being disposed about said part, said tubular bushing and pinion gear being rotatably supported by said bearing surface and axially movable relative to said bearing surface, a lubricating grease interposed between said bearing surface and the inner surface of said bushing and groove means formed on the inner surface of said bushing for collecting contaminant particles of a type that have a tendency to degrade said grease.

2. The starter drive apparatus according to claim 1 where the groove means comprises a plurality of circumferentially spaced grooves.

3. The starter drive apparatus according to claim 1 where the groove means comprises a plurality of circumferentially spaced grooves that extend parallel to each other and parallel to the longitudinal axis of the bushing, the grooves being equally circumferentially spaced.

4. The starter drive apparatus according to claim 1 where the tubular bushing is formed of a sintered bronze material.

5. The starter drive apparatus according to claim 1 where the groove means comprises a plurality of grooves that extend the entire length of the bushing and where the grooves have a radial depth of about 0.15 to 0.20 mm and a width of about 1.0 to 1.2 mm.

* * * * *